US012461710B2

(12) United States Patent  
Kumar et al.

(10) Patent No.: US 12,461,710 B2  
(45) Date of Patent: Nov. 4, 2025

(54) REFORMATTING MATRICES TO IMPROVE COMPUTING EFFICIENCY

(71) Applicant: INTERNATIONAL BUSINESS MACHINES CORPORATION, Armonk, NY (US)

(72) Inventors: Manoj Kumar, Yorktown Heights, NY (US); Pratap C. Pattnaik, Yorktown Heights, NY (US); Kattamuri Ekanadham, Mohegan Lake, NY (US); Jessica Tseng, Fremont, CA (US); Jose E. Moreira, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 17/485,455

(22) Filed: Sep. 26, 2021

(65) Prior Publication Data

US 2022/0012010 A1 Jan. 13, 2022

Related U.S. Application Data

(62) Division of application No. 16/205,208, filed on Nov. 29, 2018, now Pat. No. 11,163,528.

(51) Int. Cl.
*G06F 7/08* (2006.01)
*G06F 7/24* (2006.01)
(Continued)

(52) U.S. Cl.
CPC .................. *G06F 7/08* (2013.01); *G06F 7/24* (2013.01); *G06F 7/78* (2013.01); *G06F 17/16* (2013.01); *G06F 7/26* (2013.01)

(58) Field of Classification Search
CPC ..... G06F 7/08; G06F 7/24; G06F 7/78; G06F 17/16; G06F 7/26
See application file for complete search history.

(56) References Cited

U.S. PATENT DOCUMENTS 5,768,609 A 6/1998 Gove et al.
5,958,047 A 9/1999 Panwar
(Continued)

FOREIGN PATENT DOCUMENTS

WO 2018/007782 A1 1/2018

OTHER PUBLICATIONS

Teich et al.; Data Handling and Dedicated Hardware for the Sort Problem; 1983 (Year: 1983).*
(Continued)

*Primary Examiner* — Corey S Faherty
(74) *Attorney, Agent, or Firm* — CHIP LAW GROUP

(57) ABSTRACT

A data ordering device includes a plurality of inputs N and a plurality of outputs M. There is a sorting network coupled between the plurality of inputs N and the plurality of outputs M. There are one or more latches comprising a buffer coupled between each input of the plurality of inputs N and a corresponding input of the sorting network. There are one or more latches comprising a buffer coupled between each output of the plurality of outputs M and a corresponding output of the sorting network. There is an input for a control signal operative to initiate a sorting of data between the plurality of inputs N and the plurality of outputs M. The data ordering device is coupled to a core of a central processing unit.

11 Claims, 7 Drawing Sheets

(51) Int. Cl.
    *G06F 7/78*        (2006.01)
    *G06F 17/16*     (2006.01)
    *G06F 7/26*       (2006.01)

(56) References Cited

U.S. PATENT DOCUMENTS

| | | | |
|---|---|---|---|
| 6,389,478 | B1 | 5/2002 | Blackmore et al. |
| 7,017,028 | B2 | 3/2006 | Ben-David et al. |
| 7,177,309 | B2 * | 2/2007 | Shinohara ............ H04L 49/1561 |
| | | | 370/429 |
| 7,499,353 | B2 | 3/2009 | Kim |
| 8,307,194 | B1 | 11/2012 | Scott et al. |
| 8,375,196 | B2 | 2/2013 | Bjorklund et al. |
| 8,958,817 | B1 | 2/2015 | Murphy |
| 9,412,473 | B2 | 8/2016 | Chung |
| 9,606,913 | B2 | 3/2017 | Moschopoulos et al. |
| 9,620,176 | B2 | 4/2017 | Wu et al. |
| 9,666,300 | B2 | 5/2017 | Zhang et al. |
| 9,740,659 | B2 | 8/2017 | Sreedhar et al. |
| 9,805,816 | B2 | 10/2017 | Jan et al. |
| 9,905,309 | B2 | 2/2018 | Bang et al. |
| 10,394,822 | B2 | 8/2019 | Stearn |
| 10,489,480 | B2 | 11/2019 | Akerib |
| 10,523,596 | B1 * | 12/2019 | Ferger ..................... H04L 49/30 |
| 10,771,401 | B2 | 9/2020 | Javadi |
| 10,817,490 | B2 | 10/2020 | Li et al. |
| 11,163,528 | B2 | 11/2021 | Kumar et al. |
| 2006/0224838 | A1 | 10/2006 | Blumrich et al. |
| 2015/0019835 | A1 | 1/2015 | Anderson |
| 2016/0224465 | A1 | 8/2016 | Morad et al. |
| 2016/0276042 | A1 | 9/2016 | Pesavento et al. |
| 2016/0378476 | A1 | 12/2016 | Bradbury et al. |
| 2017/0116154 | A1 | 4/2017 | Palmer et al. |
| 2017/0177338 | A1 | 6/2017 | Gschwind et al. |
| 2017/0337156 | A1 | 11/2017 | Yadavalli |
| 2017/0337985 | A1 | 11/2017 | Borah et al. |
| 2018/0047736 | A1 | 2/2018 | Seo et al. |
| 2018/0108425 | A1 | 4/2018 | Lee et al. |
| 2018/0137928 | A1 | 5/2018 | Qiu et al. |
| 2018/0329868 | A1 | 11/2018 | Chen et al. |

OTHER PUBLICATIONS

List of IBM Patents or Applications Treated as Related.
Knuth, D. E., "The Art of Computer Programing", 2nd Ed. (1998); vol. 3 Sorting and Searching; 791 pgs., Addison-Wesley, Reading, Massachusetts, USA (Part 1, 229 pgs., cover—218).
Knuth, D. E., "The Art of Computer Programing", 2nd Ed. (1998); vol. 3 Sorting and Searching; 791 pgs., Addison-Wesley, Reading, Massachusetts, USA (Part 2, 210 pgs., pp. 219-428).
Knuth, D. E., "The Art of Computer Programing", 2nd Ed. (1998); vol. 3 Sorting and Searching; 791 pgs., Addison-Wesley, Reading, Massachusetts, USA (Part 3, 211 pgs., pp. 429-639).
Knuth, D. E., "The Art of Computer Programing", 2nd Ed. (1998); vol. 3 Sorting and Searching; 791 pgs., Addison-Wesley, Reading, Massachusetts, USA (Part 4, 141 pgs., pp. 640-780).
Furtak, T. et al., "Using SIMD Registers and Instructions to Enable Instruction-Level Parallelism in Sorting Algorithms", SPAA (2007); 10 pgs.
Inoue, H. et al., "SIMD- and Cache-Friendly Algorithm for Sorting an Array of Structures"; Proceedings of the VLDB Endowment (2015); vol. 8:11; pp. 1274-1285.

* cited by examiner

```
202 ── init_SFO (key_len, value_len, control_byte) ;
      for ( i in 0..ACTIVE_NET_INPUTS) {
204 ──── read_buffer (i,B_i,n_i) ; }
      for ( i in 0..NET_OUTPUTS) {
206 ──── write_buffer (i,B_i,n_i) ; }
      while ( rc = SFO_OP ) {
207 ────
          for ( j in {filled_output_buffers}){
              B_j = new_buffer() ;
208 ──────── write_buffer (j,B_j,n) ; }
          for ( j in {empty_input_buffers}){
              <n_j,B_j> = next_input_buffer() ;
210 ──────── read_buffer (j,B_j,n) ; }
```

FIG. 2

REFORMATTING MATRICES TO IMPROVE COMPUTING EFFICIENCY

BACKGROUND

Technical Field

Embodiments of the present disclosure generally relate to processor technology, and more particularly to data sorting techniques for improved computational efficiency.

Description of the Related Art

Today, data processing architectures provide processing of vector instructions for which a source operand or result value of the instruction is a vector that includes multiple data elements. A single instruction can be executed in parallel on multiple data points as opposed to executing multiple instructions, thereby improving performance. An array of data values to be processed can be processed efficiently by loading the data values into respective elements of a vector operand and processing several elements of the data values using a single vector instruction.

Vector store and load instructions can perform a rearrangement of the data elements as they are stored in memory from vector registers or loaded from memory into vector registers. Such rearrangement can organize data within the vector registers to facilitate efficient vector processing.

SUMMARY

According to various exemplary embodiments, a method, non-transitory computer readable storage medium, and a device of sorting a content of a memory are provided. A sectioned array of n records is received from a memory, each record including a key-value pair. In a first stage number operation, for each record, an R number of most significant bits of a key are extracted to create a control string. The record is sorted into one of the M outputs based on the control string. The records of the M outputs are stored as a M new sorted sectioned arrays (or M batches), in the memory. For a total of X stage operations, for each next stage number operation, iteratively performing, for each of the $M^{(stage\ number-1)}$ batches stored in the memory: (i) receiving each record of the batch from the memory; (ii) for each record of the batch: extracting a next R number of most significant bits of the key to create a new control string, and sorting the record into one of the M outputs based on the new control string; and (iii) storing records of the M outputs as a sorted sectioned array of M batches, in the memory.

In one embodiment, the total X stage operations=$\log_M n$ to sort all n records.

In one embodiment, X is based on a predetermined granularity of a number of records for each batch.

In one embodiment, each control string indicates to which of the M outputs the corresponding record belongs.

In one embodiment, the number R is based on log(M)/log(2).

In one embodiment, a number of bits of a key in a key value pair is based on log(n)/log(2).

In one embodiment, n>M.

In one embodiment, a total of $\log_M n$ stages of the switching functional unit are used to sort all n records.

In one embodiment, each stage involves $M^{(stage-1)}$ operations of the switching functional unit to sort all records of a batch in stage-1.

In one embodiment, each key value pair has a unique key.

In one embodiment, in a last stage of the X stages of operations, if an R number of previously unextracted number of most significant bits of a key of a key-value pair are not available, a remaining number of most significant bits of the key are extracted to create a new control string for a record.

In one embodiment, the extracting each stage of the switching functional unit is controlled by an external control unit.

According to one embodiment, a data ordering device includes a plurality of inputs N and a plurality of outputs M. There is a sorting network coupled between the plurality of inputs N and the plurality of outputs M. One or more latches comprising a buffer are coupled between each input of the plurality of inputs N and a corresponding input of the sorting network. One or more latches comprising a buffer are coupled between each output of the plurality of outputs M and a corresponding output of the sorting network. There is an input for a control signal operative to initiate a sorting of data between the plurality of inputs N and the plurality of outputs M. The data ordering device is coupled to a core of a central processing unit.

In one embodiment, the data ordering device is configured to rearrange data across multiple cache lines.

In one embodiment, the data ordering device is coupled to a core of a vector processor.

In one embodiment, the data ordering device is part of a field programmable gate array (FPGA).

In one embodiment, the data ordering device is part of a computer system configured to provide instructions to the data ordering device as part of its machine instruction set.

In one embodiment, the data ordering device is coupled to a control unit and functional units of a central processing unit.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 2 is an example code of a data rearrangement function of the control unit, consistent with an exemplary embodiment.

DETAILED DESCRIPTION

Overview

Figure 1:
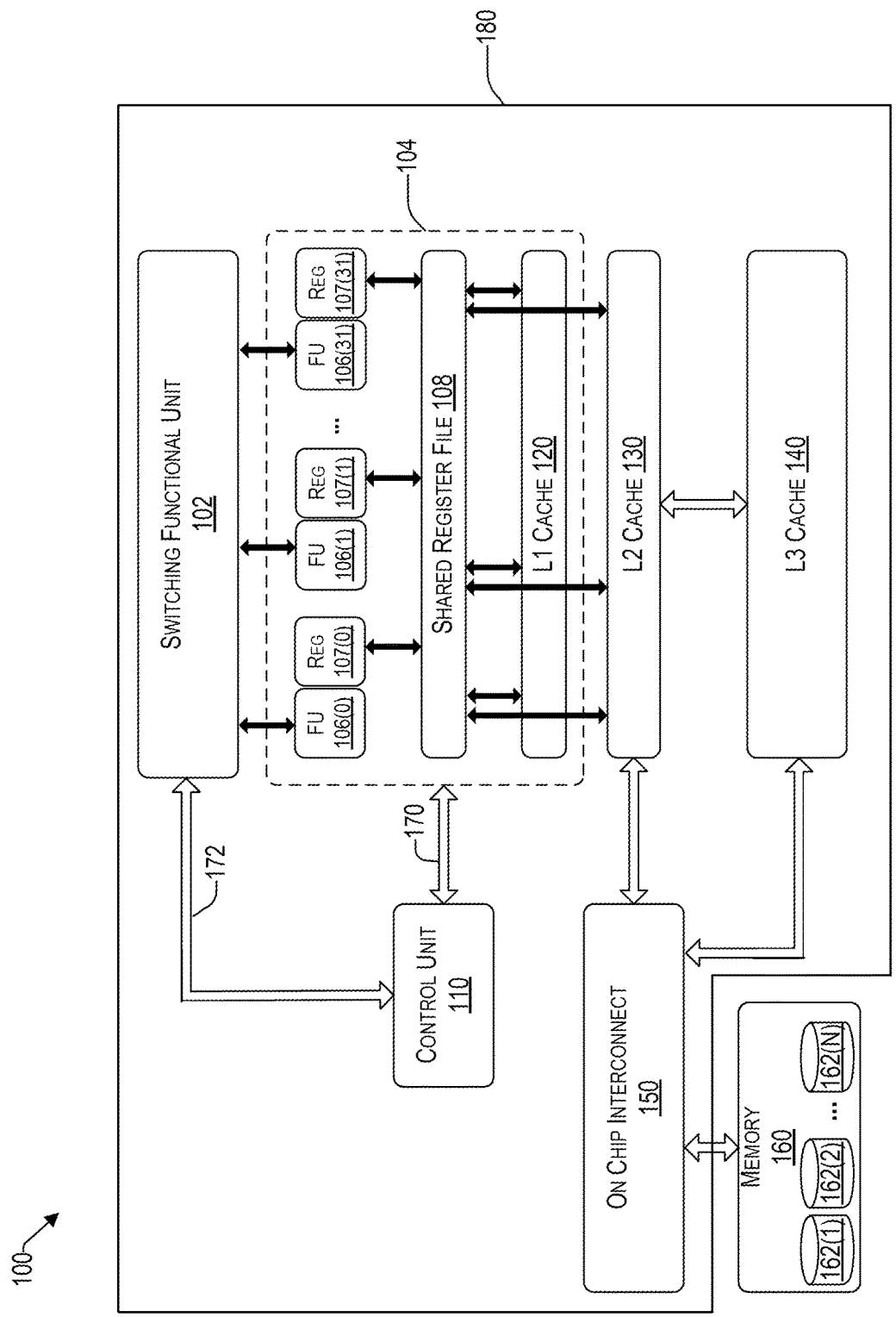
FIG. 1 is a processor system that includes a switching functional unit, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to data sorting techniques for improved computational efficiency. Processors use different types of memory, including primary storage and secondary storage. A processor interacts closely with primary storage, sometimes referred to as main memory, for both instructions and data. A processor's memory may hold data temporarily (e.g., at the time the computer is executing a program). Secondary storage may hold permanent or semi-permanent data on some external medium, such as a solid-state drive, magnetic drive, optical medium, etc. Today, computer architectures include caches, which are smaller, faster memories that are between the CPU and the main memory. Having caches provides improvement in speed to the extent the cache stores data that the processor is to process. Cache is generally much smaller than the main memory and can therefore not store all of main memory. The cache regularly evicts out information about memory locations to make space for new data. A processor receives a speedup from the cache if the data to be fetched from memory is still in the cache when it is accessed again. When the cache has the data that is needed by the processor, it is referred to a cache hit. If the cache does not include the data, it is a cache miss. The ratio of the number of hits to all accesses is referred to a cache hit ratio.

Because memory is typically substantially slower than the processor, the cache hit ratio is salient to overall performance of a computing system. On a cache miss, the cache line is filled from main memory. Thus, a series of memory reads to nearby memory locations are likely to mostly hit in the cache. When there is a cache miss, a whole sequence of memory words is requested from main memory at once.

Therefore, caches improve performance when memory accesses exhibit locality: accesses are clustered in time and space, so that reads from memory tend to request the same locations repeatedly, or even memory locations near previous requests. Caches work efficiently with computations that exhibit locality and therefore have a high cache hit ratio.

For example, bandwidth between a processor to memory is often a significant performance bottleneck in cognitive applications that include analysis of large social graphs, or training of neural networks when the weight matrices are sparse. Large social graphs are represented as adjacency matrices. Similarly, machine learning models deal with large sparse matrices. Big data, which may use middleware such as Hadoop, spark, etc., "shuffle" operations and data warehouse join operations sort large arrays of key value pairs (discussed in more detail later). These applications lack the spatial locality in access to data, salient for caches to work effectively.

To that end, in one aspect, the layout of data in memory is reordered in such a way that when a cache line is brought into a processor's cache from memory, the processor utilizes all or most of it before the cache line is evicted from the cache to make room for another cache line. Methods and systems are provided herein that perform reordering of the memory content, such as the primary memory, by integrating a data reordering or switching network into a processor, thereby improving efficiency of the computing system.

Reference now is made to FIG. 1, which is a processor system 100 that includes a switching functional unit 102, consistent with an illustrative embodiment. The system 100 includes a processor core 104 that is coupled to a control unit 110. The control unit 110 fetches and decodes the instructions and emits control signals 170 to orchestrate the activities of the functional units 106(0) to 106(31). There is external memory 160 that can include one or more memory modules 162(1) to 162(N). Typically, the processor core includes an L1 cache 120. In some embodiments, there is an L2 cache (130) and an L3 cache (140). One or more processor cores sharing L3 typically make up a processor module). There is an on-chip interconnect 150 that couples the external memory 160 to the level 2 and 3 caches (130 and 140).

The memory 160 represents storage that is external to the processor module 180, sometimes referred to as a chip or socket. The secondary storage 160 may include memory modules, such as a magnetic disk (e.g., hard drive (HD)), solid state drive (SSD), floppy disk, optical drive, etc. For example, data stored in the memory 160 can be accessed via an on-chip interconnect 150 that may transfer the data to a level 2 or 3 cache 130, 140, which can be read by the processor module 180 via a shared register file 108. Due to its relatively remote location (i.e., not part of the core 104 but via on chip interconnect 150, accessing information from the memory 160 by the core 104 is more time consuming than that of L1 cache 120, L2 cache 130 or L3 cache 140.

For faster operation, the system 100 includes various caches, which are smaller, faster memories that are coupled between (or part of) the core 104 and the secondary memory 160. In various embodiments, there may be several levels of cache. For example, the primary L1 cache 120 may be the fastest cache and is therefore part of the core 104 of the processor. There may be an L2 cache 130, which may be larger but slower than the L1 cache 120. There may be a tertiary (L3) cache 140 or a fourth level cache (L4—not shown), which may be on a same chip as the core 104 or separate therefrom.

The control unit 110 coupled to the processor core 104 and a switching functional unit 102, includes circuitry that uses electrical signals to direct the entire computer system 100 to carry out, or execute, stored program instructions. The control unit 110 does not execute program instructions; rather, it directs other parts of the system 100 to do so. The control unit 110 is also operative to advance the sorting of data arrays by issuing various control signals to affect the switching operation of the switching functional (SFU) unit 102. To that end, the control unit 110 can: (i) issue a one or more control signals 170 to the functional units other than the SFU 102 (e.g., 106(0) to 106(31)) to stage the data to the SFU 102 inputs; (ii) issue one or more control signals 172 for the SFU 102 to rearrange the data presented at its inputs; and (iii) issue one or more control signals 170 to the functional units other than the SFU 102 (e.g., 106(0) to 106(31)) to offload the data from the SFU 102 outputs. Data arrays much larger than the size of SFU inputs are rearranged according to a specified field in the data, using $[\log_M n]$ operations of SFU operations, where M is the number of outputs in switching functional unit 102, and n is the size of data array that is being sorted thereby.

FIG. 2 provides an example code 200 of a data rearrangement function of the control unit 110, consistent with an exemplary embodiment. The "init_SFO" instruction defines the data layout, providing the length of the key, the length of the vector, and the offset of the control byte in the key. These parameters are discussed in more detail later. The "read_buffer" 204, 210 and "write_buffer" 206, 208 instructions are issued by the control unit 110 to the functional units 106(0) to 106(31). They signal the empty or full status of the buffers 320 and 340 in SFU 360, respectively. The "SFO_OP" instruction 207 completes in one of two modes: (i) "rc==0" indicating that all input has been consumed and all outputs have been transferred to the functional units (FUs) (e.g., 106(0) to 106(31)), and (ii) "rc !=0" indicating that either an output buffer is full, or that an input buffer transitioned from non-empty to empty.

Returning to FIG. 1, the switching functional unit (SFU) 102 is configured to receive its inputs from the vector registers and write back the rearranged data back into the vector registers. For example, the SFU sorts an array of data stored across multiple vector registers according to a specified field in the data. The SFU 102 rearranges data resident in memory of a computing system across one or more cache lines. In this way, data can be sorted to facilitate an efficient processing of the data by the core 104. In various embodiments, the switching functional unit 102 can be embodied in hardware on the processor core, external to the processor module as an FPGA, in software, or a combination thereof.

The core 104 is a computational unit of a central processing unit (CPU), which can read and execute program instructions, such as move data, add, and branch. The core 104 may include a shared register file 108, which temporarily holds data taken from or about to be sent to memory (e.g., L1 cache 120 and/or L2 cache 130). Shared register files are analogous to vector registers and are shared across all FUs.

The core 104 includes one or more functional units (e.g., 106(0) to 106(31)), each configured to move key-value pairs from registers proximal to it, to network buffers, discussed in more detail later. One or more functional units, sometimes referred to as execution units, are part of the core 104. They perform operations instructed by the control unit 110 and/or a program. The functional units can be identical, or heterogeneous in terms of the operations they can perform. A functional unit may include an arithmetic logic unit (ALU), a floating-point unit (FPU), etc. By way of example only, and not by way of limitation, FIG. 1 includes 32 functional units 106(0) to 106(31), while it will be understood that other configurations, such as 16, 64, 128, etc., functional units are supported as well.

In one embodiment, each functional unit is paired to a corresponding one or more private registers that are proximal thereto. For example, functional unit 106(0) is paired to a dedicated register 107(0); functional unit 106(1) is paired to a dedicated register 107(1); functional unit 106(2) is paired to a dedicated register 107(2); and so on. Each private register can be directly accessed by its corresponding functional unit, and not by other functional units. In contrast, the shared register file 108 can be accessed by all functional units 106(0) to 106(31). By virtue of each functional unit having its own one or more private registers, the number of accesses to the shared register can be reduced by transferring multiple data elements from the shared registers to the private registers in one access, and then having the functional unit access one element at a time from the private register multiple times. In some embodiments, the core 104 may be part of a multi-core processor.

Figure 3:
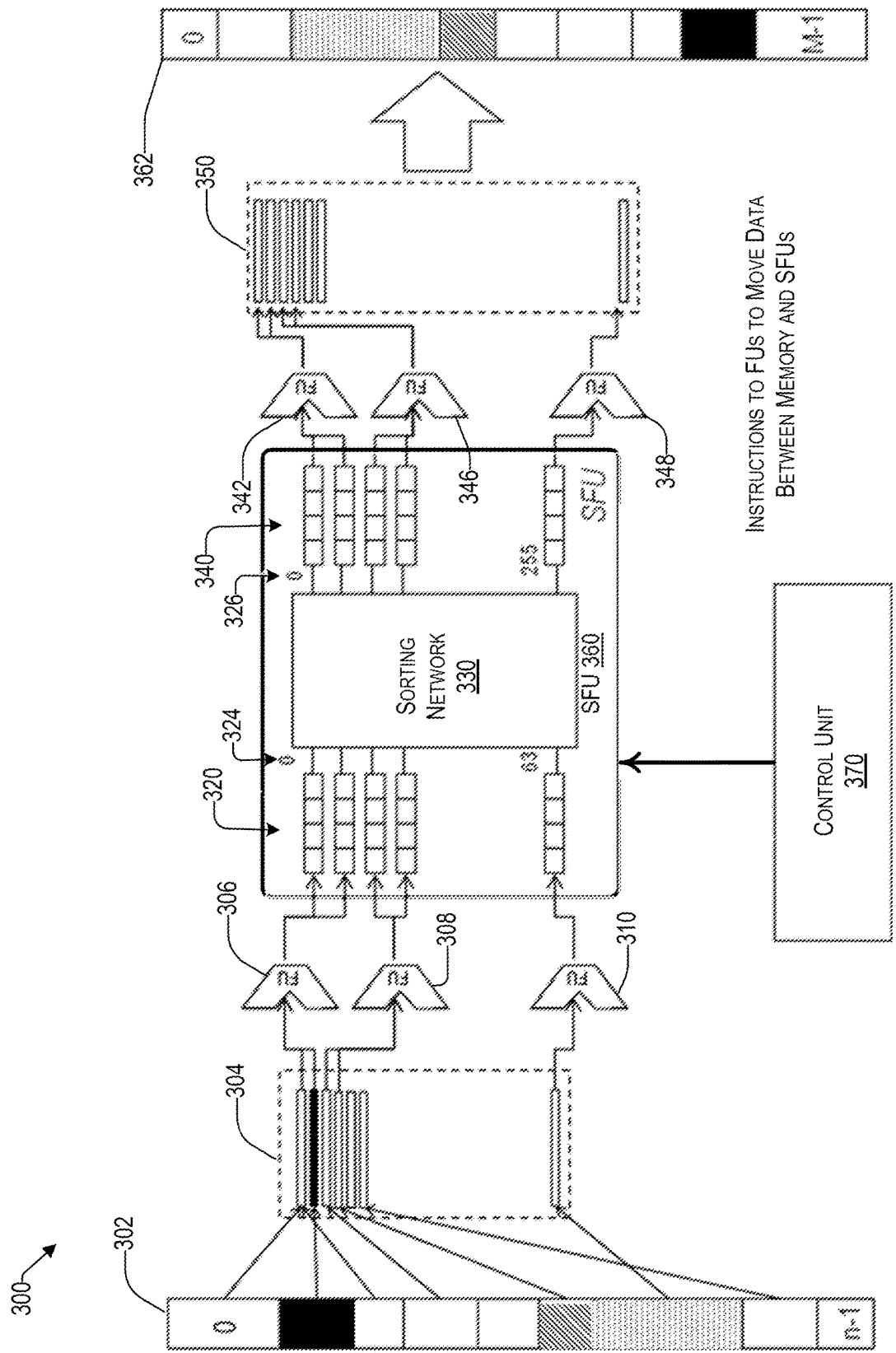
FIG. 3 is a conceptual block diagram of a data reordering system that includes a switching functional unit, consistent with an illustrative embodiment.

Reference now is made to FIG. 3, which is a conceptual block diagram 300 of a data reordering system that includes a switching functional unit 360, consistent with an illustrative embodiment. The block diagram 300 includes an input sectioned array of key value pairs 302, which represents the data to be sorted. There is an output sectioned array of key value pairs 362, which represents data that is sorted (or partially sorted in a multi stage sorting process). There are one or more functional units 306 to 310 at the input of the switching functional unit 360 and one or more functional units 342 to 348 at the output of the switching functional unit 360. Each functional unit (e.g., 306 to 310 and 342 to 348) has one or more private vector registers coupled thereto (e.g., 304 or 350). The private vector registers 304 and 350 are divided into equal sized sections proximal to the functional units 306 to 310 and 342 to 348, respectively. Each functional unit is responsible for moving key-value pairs from the private vector register(s) proximal thereto, to the sorting network buffers 320 and 340 and vice-versa.

While functional units at the input 306 to 310 are drawn separate from the functional inputs at the output 342 to 346, in one embodiment, the input functional units are the same as those at the output. Stated differently, the functional units can be shared between the input and output of the switching functional unit 360, where a functional unit can be used as an input device at one time interval and an output device at a different time interval. Similarly, the private registers can be shared between the input and the output of the switching functional unit 360. In this way a high bandwidth access to the functional units 306 to 310 and 342 to 348 is provided under restricted (e.g., non-interfering) access patterns.

The switching operation is the basic unit of work handled by the switching functional unit. FIG. 3 illustrates the flow of data during a switching operation. At the left of the block diagram 300 is a sectioned array of key value pairs 302, which represents the data to be sorted or rearranged by the switching functional unit 360 and stored in memory. In one embodiment, the number of sections, n, of the sectioned array of key value pairs is much larger than the number of sorting network 330 inputs N (e.g., 0 to 63 in the present example). Each section of the array being sorted 302 is mapped to a unique vector register group 304, and hence a particular sorting network 330 input.

The switching functional unit 360 is shown in the middle of FIG. 3. The switching functional unit 360 includes a sorting network 330 having a plurality of inputs 324 (e.g., 0 to 63) and a plurality of outputs 326 (e.g., 0 to 255). Input 324 includes buffers 320, one buffer for each input, each buffer capable of holding one or more key value pairs. Similarly, each output of the sorting network 326 includes one buffer 330. These buffers 320 and 340 are configured to store one or more key-value pairs. In various embodiments, each buffer can store one key-value pair or multiple key-value pairs, one key-value pair per latch.

Feeding the input buffers 320 are the functional units (FUs) 306 to 310, which are coupled between the private vector resisters 304 and the buffers 320. The functional units 306 to 310 stage the data to be rearranged from the memory to the private vector registers 304 and ultimately to the sorting network 330 of the switching functional unit 360. The process of moving data from the buffers 340 at the output of the switching functional unit 360 to memory 362 is similar to that of reading from memory. The result of the switching functional unit 360 operation is also stored back as a sectioned array of key-value pairs 362, where the number of sections, M, is same as the number of sorting network 330 outputs M. The control unit 370, same as 110 in FIG. 1, provides instructions to the functional units 306 to 310 and 342 to 348, to move data between memory 302 and the switching functional unit 360 and then back to memory 362.

Figures 4A, 4B:
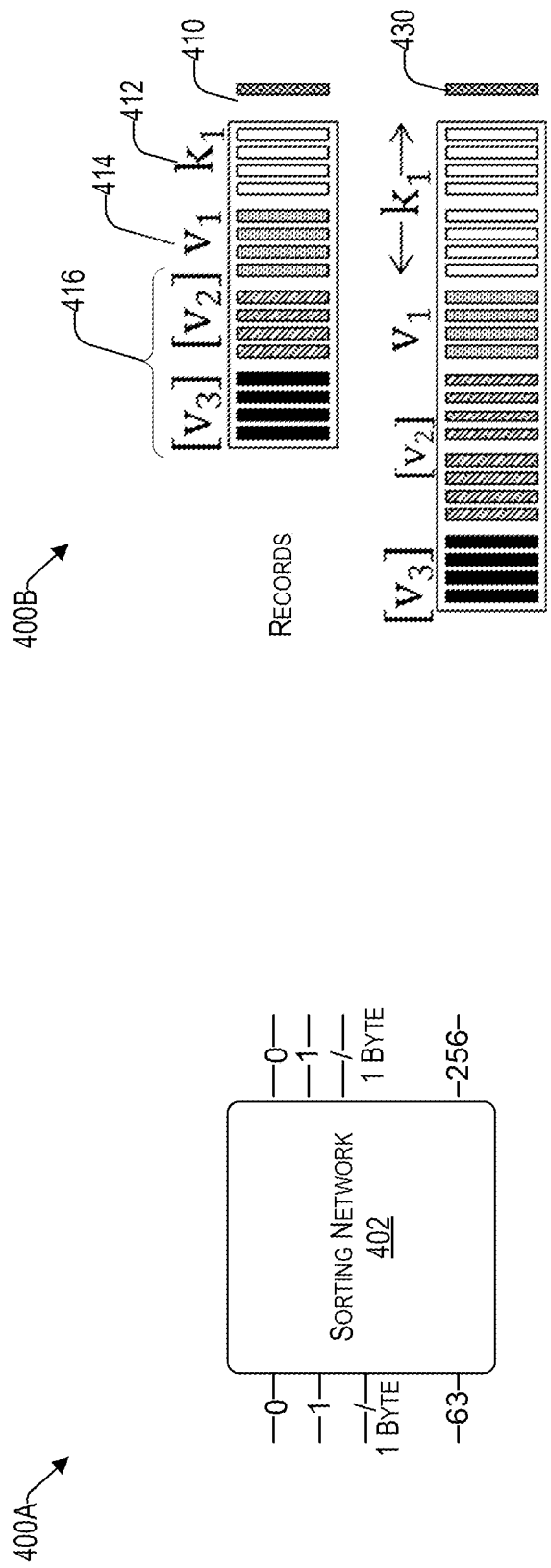
FIGS. 4A and 4B provide an example high level block diagram of a sorting network and example payload formats of the sorting network, respectively.

FIGS. 4A and 4B provide an example high level block diagram of a sorting network 330 and example payload formats of the sorting network, respectively. The example sorting network 402 of FIG. 4A has 64 input nodes and 256 output nodes. Each node has a byte length. The switch size is limited by the number of registers used to hold an internal state and the complexity of irregular wiring (e.g., too many wires crossing over each other when restricted to one, or a few. two dimensional surfaces). The switch size is also limited by the bandwidth at which the data at the output can be flushed to external memory 160 in FIG. 1.

FIG. 4B illustrates that a payload includes a key $k_1$ 412 value $v_1$ 414 pair. In some embodiments, additional values may be included for a key $k_1$ 412 (e.g., $<k_1>,<v_1, v_1, \ldots>$). A portion of the key (e.g., field in the key) is extracted as the control byte (e.g., 410, 430), based on the instruction received from the control unit. The payload may be byte wide. To facilitate the discussion, the examples herein assume data paths of 8-bits wide, 64 inputs, and 256 output ports for the sorting network 402, while it will be understood that other configurations are supported as well, based on the concepts herein.

Figure 5:
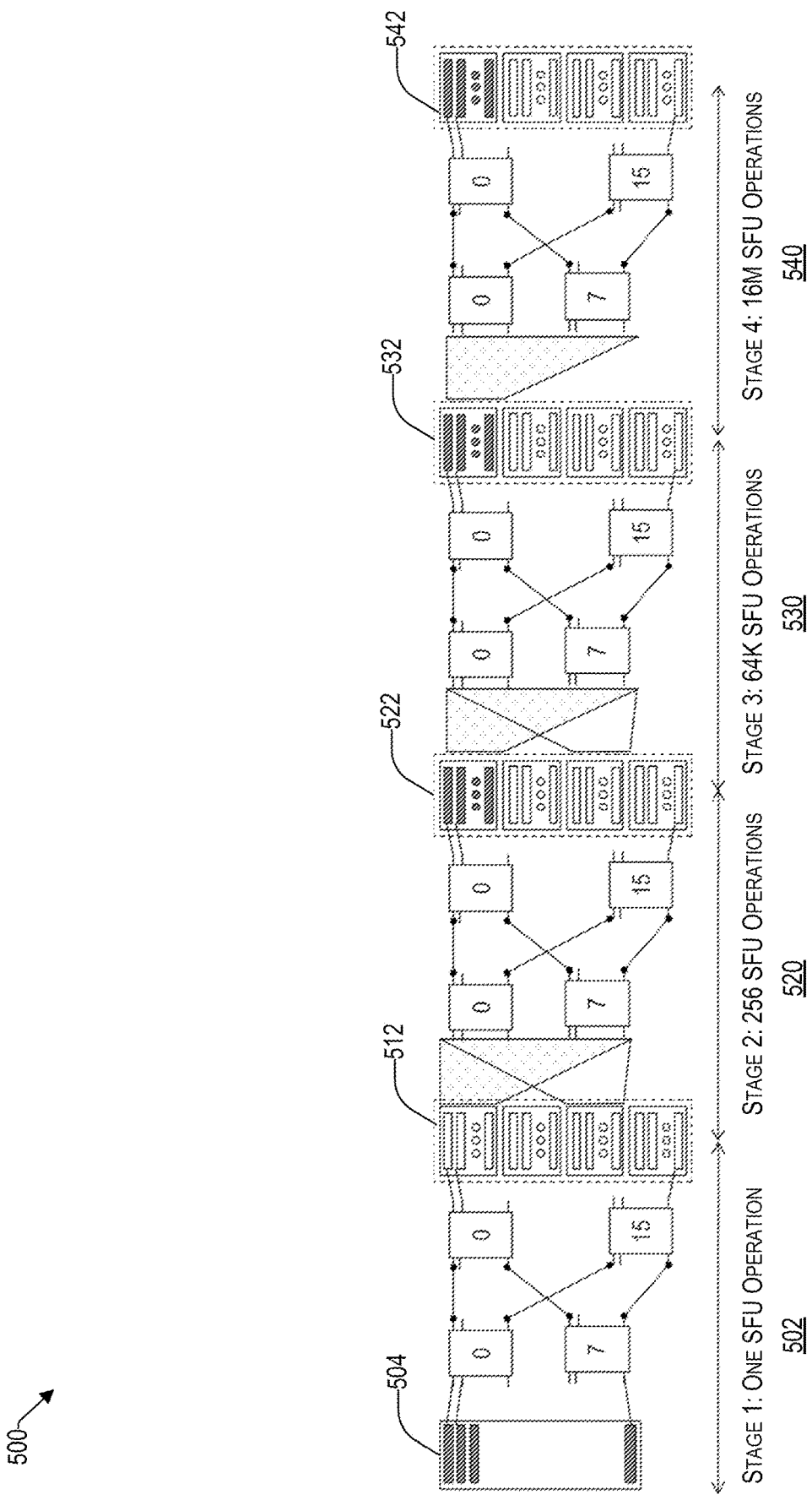
FIG. 5 illustrates a conceptual block diagram of an iterative sorting, consistent with an example embodiment.

In some scenarios, a large array may not be able to be sorted in one SFU operation of the switching functional unit 360. In this regard, the switching functional unit 360 may be used iteratively until all the data of an input sectioned array of key value pairs 302 is processed. FIG. 5 illustrates a conceptual block diagram 500 of an iterative sorting, consistent with an example embodiment. A large array of n×k key-value pairs with n distinct keys, where n>>N, involves [$\log_M n$] stages of switching functional unit operations to order its elements by the key field. In the example of FIG. 5, four stages are appropriate to sort an array of up to four billion distinct keys for a switching functional unit having 256 outputs.

The first operation 502 partitions the array of n×k key-value pairs into M (where M is 256 in the present example) batches, numbered 0 through 255, with approximately (n×k/M) key-value pairs in each batch. The most significant eight bits of the key (e.g., 32 bit key) may be used as the control byte. The first stage 502 uses one switching functional unit operation. Batch numbered i at the output of first stage will then include key-value pairs with keys in the range $i \times 2^{24}$ to $(i+1) \times 2^{24} - 1$ for $0 \le i < 256$.

The second stage 520 uses M switching functional unit operations (e.g., sorting 526) to further partition each of the M batches 512 produced by the first stage 502, thereby generating a total of $M^2$ batches. Batch j will then include key-value pairs with keys in the range $j \times 2^{16}$ to $+1) \times 2^{16} - 1$ for $0 \le j < 2^{16}$. The control byte in the second stage 520 comprises eight bits to the right of the control byte in the first stage 502.

The third stage 530 and the fourth stage 540 similarly create smaller batches, the output of the last output 542 being n key-value pair arrays, each having on average k elements, which can be concatenated to form a single array sorted by keys. In some scenarios, a complete sorting of a vector array may not be necessary, depending on the purpose of the sorting. For example, if the objective is to localize access to a particular level of cache, or to the local memory of nodes in a non-uniform memory access (NUMA) system, then the last stage operations of the complete sort solution can be skipped.

With the foregoing overview of an example iterative sorting, it may be helpful to provide a more detailed example based on converting a 1G×1G matrix A from compressed storage by column (CSC) representation to compressed storage by row (CSR) representation using the same FIG. 5. To that end, various nomenclature is defined below.

A particular row R, of a matrix is sometimes referred to herein by the binary representation of its address $R_n R_{n-1} \ldots R_0$, or abbreviated using a colon as $R_n:R_0$. Similarly, a column C can be represented as $C_n C_{n-1} \ldots C_0$, or abbreviated using a colon as $C_n:C_0$. Note the use of upper-case letters in the binary representation (e.g., the upper-case $C_i$s and $R_i$s) are constant (i.e., specific values).

Certain collections of rows, where the binary representation of an address differs only by a specific location of bits, can be represented by mixing upper-case and lower-case letters. The lower-case letters represent a variable value that can be either a 0 or a 1. Thus, $R_n R_{n-1} \ldots R_8 r_7 \ldots r_0$, also abbreviated as $R_n:R_8 r_7:r_0$, represents the set of 256 consecutive rows starting at address $R_n:R_8$. Similarly, $c_n c_{n-1} \ldots c_8 C_7 \ldots C_0$, also abbreviated as $c_n:c_8 C_7:C_0$, represents the set of every $256^{th}$ column starting at column address $0_n:0_8, C_7:C_0$.

A block in the matrix, whose row and column numbers of the upper left corner are integral powers of 2, and the height and width are also an integral power of 2, which can be represented as $R_n:R_x C_n:C_y$. By using lower-case letters, we can refer to a collection of blocks. For square matrices of dimension $a=2^n$, if the block-size too is 'a' elements, then $y=n-x$, and the block can be represented as $R_n:R_x C_n:C_{n-x}$. Furthermore, $n=\log_2 a$.

With the foregoing nomenclature, we refer back to FIG. 5, which is used in the context of a sparse matrix of one Billion rows and one Billion columns (i.e., a=1 Billion). By way of example, the matrix is transposed using the switching functional unit discussed herein. On average, the number of entries in each row or each column is k, where k in a graph analytics application may be, for example, 8, 16, 32, or 64. The CSC representation of the matrix is a sectioned array of n×k<key, value> pairs, or kBillion <key, value> pairs. There are one Billion, or a, sections corresponding to the a columns. Transposing a sparse matrix is equivalent to converting a CSC representation to a CSR representation. Henceforth, we will refer to a <key, value> pair as record. The key in our representation is initially the row index with binary representation $r_{29}:r_0$. The section identifiers are the column addresses with binary representation $c_{29}:c_0$.

The general principal of using the switching functional unit to transpose the matrix is that in each stage of the switching functional unit operations, the key loses some amount of row information and gains some amount of column information. At every stage, we keep the number of sections, combined over all sectioned arrays, constant. So analogously the section identifiers lose the column information gained by the key and gain the row information lost by the key. After a few stages, the key is entirely the column index and the section identifier is entirely the row index, corresponding to the CSR representation of the matrix. A more detailed exposition of this general principle is provided below.

In the example of FIG. 5, the switching functional unit is being used four times, or equivalently in four stages 502, 520, 530, and 540. The input to the first stage 502 is represented by a sectioned array of key value pairs 504, and the output of the last stage 540 is represented by an output sectioned array of key-value pairs 542. In between the stages are the intermediate inputs and outputs (512, 522, and 532).

Thus, the input 504 to the first stage 502 is a sectioned array of <key, value> pairs, each section corresponding to a column of the matrix. The number of records, or <key, value> pairs in each section of this first stage input, is equal to the number of non-zero values in that column, that is on average χrecords, the key representing the row-index of the value.

Figure 6:
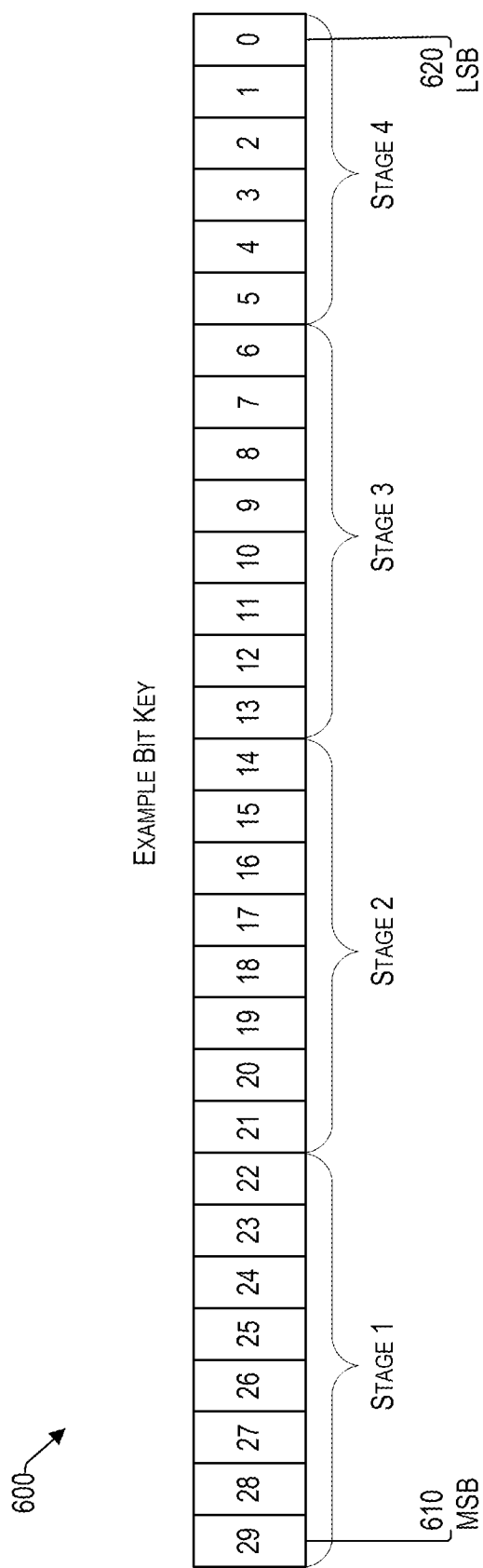
FIG. 6 illustrates an example bit key for a 1 Billion input sectioned array of key value pairs.

In one embodiment, in the first stage operation 502, for each record, the switching functional unit extracts the eight most significant bits of the key (i.e., bits $r_{29}$:$r_{22}$) to create a control byte, which is attached (e.g., prefixed) to the corresponding record. In this regard, FIG. 6 illustrates a bit key 600 for the present example of 1 Billion input sectioned array of key value pairs. The example bit key 600 includes 30 bits (i.e., bits $r_{29}$:$r_{20}$), where the MSB 610 is bit $r_{29}$ and the LSB 620 is bit $r_0$. The first 8 MSB's are used in in stage 1, the next 8 MSB's in stage 2, and so on, until the LSB 620 is accommodated. Each set of MSB's for a stage is a control byte. The control byte determines the output port of the switching functional unit to which the record is to be delivered. The number of bits in the control byte are based on the size of the switch. For example, for a 256-output switch, 8 bits (e.g., $2^8$=256) are used.

Returning to FIG. 5, the switching functional unit processes (i.e., sorts the location of) 256 sections, identified by the bits $C_{29}$:$C_8$ $c_7$:$c_0$, from the input sectioned array 504, as a group and marks the end of the section at the output when the group completes traversing the switching functional unit. (E.g., the upper-case 'C' bits identify the group and the lower-case 'c' bits identify records within the group being coalesced). The key is updated by rotating the control byte out the left and inserting $c_7$:$c_0$ from the right. The new key is thus $r_{21}$:$r_0$:$c_7$:$c_0$.

The output of the first stage 502 is 256 sectioned arrays 512 (i.e., the original sectioned array has been split into 256 parts identified by the bits $r_{29}$:$r_{22}$ (the control byte)), each part delivered to the correspondingly numbered sorting network output of the first stage, and each part having one section from a group. Thus, each of the 256 output sectioned arrays has four million sections (i.e., one billion divided by 256), where some sections are possibly empty. The bits $r_{29}$:$r_{22}$ used in routing records in the first stage 502 are from the key, and those eight bits identify the 256 sectioned arrays at the output of stage 1. Furthermore, the key gains eight bits corresponding to the location of the column within the group that contributed to the section.

In the example of FIG. 5, the output 512 of the first stage 502 has 256 outputs, referred to herein as batches, each spanning 4M rows. Each of the 4M sections within the batch span 256 columns. Each output is a sectioned array representing a 4 million row sub-matrix of the original matrix 504, and each section covering 256 columns. The number of records in these outputs can differ and can be calculated as part of program instructions by counting the number of <key, value> pairs transferred out of the output buffers 340 (also the same as 512, 522, 532, and 542).

The second stage 520 of switching functional unit operation sequentially processes each of the 256 sectioned arrays (sometimes referred to herein as batches) produced by the first stage, splitting each of them into further 256 pieces, thereby creating a total of $M^2$ (i.e., $256^2$=64 K) sectioned arrays (batches) at the output of the second stage 520, represented by the output 522. Each of these 64K arrays (batches) of output 522 represents 16K rows of the original matrix and has 16K sections. The control byte used by the second stage is the 8 bits following the 8 most significant bits of the 30-bit row-address (i.e. bits $r_{21}$: $r_{14}$ in the key 600), which are extracted from the most significant byte of the current key and prefixed to the corresponding record. These bits now determine the output port of the switching functional unit to which the records are delivered in the second stage. Once again, in each operation, the switching functional unit processes 256 sections, identified by the bits $r_{29}$:$r_{22}C_{29}$:$C_{16}c_{15}$:$c_8$, from the input sectioned arrays $r_{29}$:$r_{22}$, as a group and marks the end of the section at the output when the group completes traversing the switching functional unit. As each group of sections of stage 2 input is sent to the switching functional units, the functional units update the key in the records to $r_{13}$:$r_0$:$c_{15}$:$c_0$.

The 64K sectioned arrays at the output of the second stage 520 are depicted by output 522. For each sectioned array being split, a corresponding control byte $r_{21}$:$r_{14}$ is concatenated to the right (e.g., appended) to the identifier of the batch, making the identifier of the stage 2 output $r_{29}$:$r_{14}$. Each of the 64K output sectioned arrays after the second stage has 16K sections (e.g., one billion divided by 64K), where some sections may be empty. The control byte, (i.e., bits $r_{21}$:$r_{14}$) used in routing records in the second stage 520 is deleted from the key, and those eight bits are added to the existing identifier of the 64K sectioned arrays at the output of stage 1, where the identifier is the sequential index assigned to the $M^{stage\_numbber}$-1 batches. Furthermore, the key has gained eight bit of the section within a coalesced group.

The third stage of switching functional unit operation sequentially processes each of the 64K sectioned arrays 522 produced by the second stage 520, splitting each of them into further 256 pieces to create a total of $M^3$ (i.e., $256^3$=16 million) sectioned arrays at the output of the third stage 530. Each of these 16 million sectioned arrays at the output of the third stage represents 64 rows of the original matrix and has 64 sections. The control byte used by the third stage is the 8 bits following the 16 most significant bits of the 30-bit row-address (i.e. bits $r_{13}$: $r_6$ in the key 600), which are now the most significant byte of the current key. These bits now determine the output port of the switching functional unit to which the records are delivered by the third stage 530. Once again, the switching functional unit processes 256 sections, identified by the bits $r_{29}$:$r_{14}C_{29}$:$C_{24}c_{23}$:$c_{16}$, from the input sectioned arrays $r_{29}$:$r_{14}$, as a group and marks the end of the section at the output when the group completes traversing the switching functional unit. As each group of sections of the stage 3 input 522 is sent to the switching functional unit, the functional units update the key in the records to $r_5$:$r_0$: $c_{23}$:$c_0$.

The 16 million sectioned arrays at the output 532 of the third stage 530 have the control byte $r_{13}$:$r_6$ added to the identifier of the input sectioned array being split, making the identifier of the stage 3 output $r_{29}$:$r_6$. Each of the 16 million output sectioned arrays 532 after the third stage 530 has 64 sections (i.e., one billion/$M^3$, where M is 256), where some sections may be empty. The control byte, bits $r_{13}$:$r_6$, used in routing records in the third stage has been deleted from the key, and those eight bits are added to the existing identity of the 16 million sectioned arrays at the output 532 of stage 3. Furthermore, the key has gained eight bits indicating the relative address of section within the group of sections that were coalesced into one section.

Finally, the fourth and last stage of the switching functional unit operation sequentially processes each of the 16 million sectioned arrays (batches) produced by the output 532 of stage 3 (530). Since the 64 sections in each batch are less than N=256, a batch can be processed in a single SFU operation, thereby producing 64 arrays of records corresponding to the 64 rows of the matrix at the output 542. The control bits are now the remaining bits of the 30-bit row-address (i.e. bits $r_5:r_0$ in the key 600). The functional units update the key to $c_{29}:c_0$, as needed by the CSR representation of the matrix.

Example Process

Figure 7:
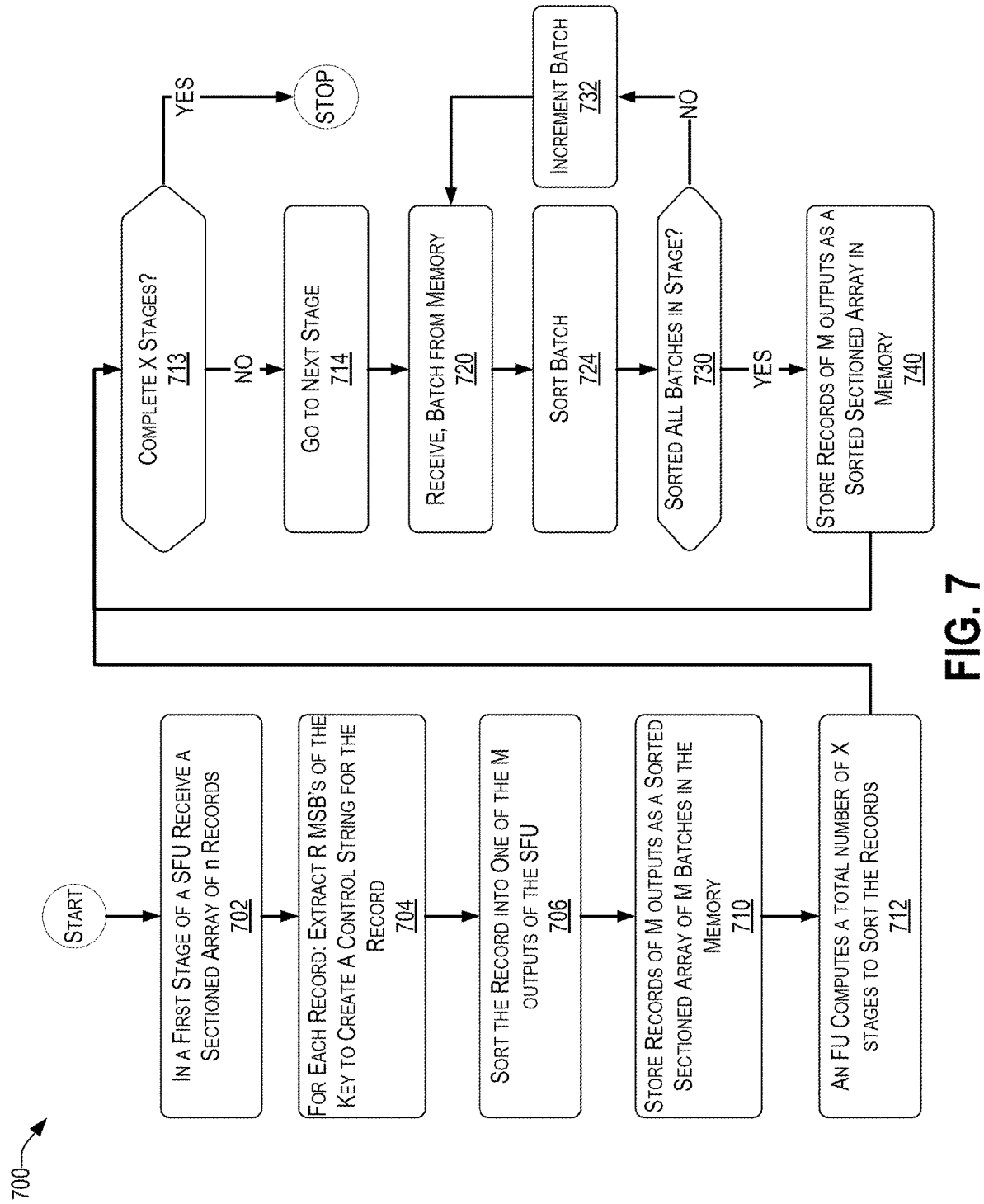
FIG. 7 presents an illustrative process for sorting an array of key-value pairs.

With the foregoing overview of the processor system 100, example code 200, conceptual block diagram of a data reordering system 300, and an example of an iterative sorting 500, it may be helpful now to consider a high-level discussion of an example process. To that end, FIG. 7 presents an illustrative process 700 for sorting an array of key-value pairs. Process 700 is illustrated as a collection of blocks in a process, representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 700 is described with reference to the block diagram 300 of FIG. 3.

By way of example, the process is described from the perspective of a switching functional unit having N inputs and M outputs, which is presented with a sectioned array of key-value pairs 302 having n sections, each section having 0, 1, or multiple records (i.e., key-value pairs), all sections collectively having n distinct keys. The key of a key-value pair includes control string, which can be based on the number of SFU outputs.

At block 702, in a first stage of a switching functional unit, a sectioned array of n sections is received at the N inputs in groups of M sections at each input.

At block 704, for each record in the received sections, an R number of most significant bits (MSBs) of the key are extracted to create a control string for the record. In one embodiment, the control string is attached (e.g., appended) to the corresponding record. In one embodiment, the length (i.e., number of bits) in the key=(Log n)/(Log 2). For example, if n=1E9, then the control string=30. In one embodiment, R=log(M)/log(2). For example, for switching functional unit having 256 outputs (M), R=8 bits. Accordingly, the key is being modified by replacing the control byte in the key with some details of the columns coalesced. This is performed by the functional units before the record is presented to the SFU. Thus, the control byte is taken out and saved elsewhere in the record.

At block 706, each record is sorted into one of the M outputs of the switching functional unit based on the control string. Stated differently, the control string indicates to which of the M outputs the particular record belongs. The sorting on consecutive groups of sections is sequentialized.

At block 710, the records at the M outputs are stored as M sorted sectioned arrays or M batches, in the memory 160 of FIG. 1.

At block 712, one of the FUs computes a total number of stages X required to sort the records. In various scenarios, depending on the purpose of the sorting, the number of stages X can vary. In one embodiment, the number of stages X to sort all n records is $\log_M n$ (rounded up to the next higher integer value). For example, for M=256 and n=1E9, X is 4. In one embodiment, the number of stages is based on a predetermined resolution for comparing the keys in the record. For example, if having a resolution of 64 for the comparison of keys is enough in our present example having n=1E9 and M=256, then X can be set to 3.

At block 713, it is determined whether all X stages are completed. If not ("NO" at decision block 713), the process proceeds to block 714, where the next stage of the switching functional unit is entered. If all X stages are completed ("YES" at decision block 713), the process ends.

At block 720, the switching functional unit 360 receives a batch of the $M^{(stage-1)}$ batches (prepared by the previous stage) from the memory.

At block 724, the batch is sorted by the switching functional unit. For example, for M=256, the number of batches available for the first stage is 1, namely the original sectioned array of key value pairs; the number of batches for the second stage is $256^{(stage-1)}=256$; the number of batches for the third stage is $256^{(stage-1)}=64K$, and the number of batches for the fourth stage is $256^{(stage-1)}=16M$. Each batch involves a switching functional unit operation. Thus, the first stage has one switching functional unit operation; stage 2 has 256; stage 3 has 64K; and stage 3 has 16M.

At block 730, if all batches in the present stage are not sorted (i.e., "NO" in decision block 730), the process continues with block 732, where the number of the batch is incremented and the new batch received in block 720. However, if all the batches in the present stage were sorted (i.e., "YES" at decision block 730), the process continues with block 740 where the records of the M outputs are stored as a sorted array in memory. In one embodiment, the determination is made by a controller that is external to the switching functional unit 360.

Accordingly, blocks 713-740 can be summarized as follows: for each next stage number operation, of a total of X stage operations of the switching functional unit, the switching functional unit 360 iteratively performs, for each of the $M^{(stage\ number-1)}$ batches stored in the memory: (i) receiving, from the memory, at the N inputs of the switching functional unit, each record of the batch; (ii) for each record of the batch: extracting a next R number of most significant bits of the key to create a new control string for the record; and sorting the record into one of the M outputs of the switching functional unit based on the new control string; and (iii) storing records of the M outputs as a sorted sectioned array of M batches, in the memory.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:
1. A data ordering device, comprising:
a plurality of inputs N;
a plurality of outputs M;
a sorting network coupled between the plurality of inputs N and the plurality of outputs M;

one or more latches comprising an input buffer coupled between each input of the plurality of inputs N and a corresponding input of the sorting network;

one or more latches comprising an output buffer coupled between each output of the plurality of outputs M and a corresponding output of the sorting network, wherein the sorting network is coupled between the input buffer and the output buffer;

one or more private vector registers coupled between the plurality of inputs N and the input buffer;

one or more private vector registers coupled between the plurality of outputs M and the output buffer; and an input for a control signal operative to initiate a sorting of data between the plurality of inputs N and the plurality of outputs M.

2. The data ordering device of claim 1, wherein the data ordering device is coupled to a core of a central processing unit.

3. The data ordering device of claim 1, wherein the data ordering device is configured to rearrange data across multiple cache lines.

4. The data ordering device of claim 1, wherein the data ordering device is coupled to a core of a vector processor.

5. The data ordering device of claim 1, wherein the data ordering device is a field programmable gate array (FPGA).

6. The data ordering device of claim 1, wherein the data ordering device is part of a computer system configured to provide instructions to the data ordering device as part of a machine instruction set of the computer system.

7. The data ordering device of claim 1, wherein the data ordering device is coupled to a control unit and functional units of the central processing unit.

8. The data ordering device of claim 1, wherein the data ordering device is configured to:
receive, from a memory, a sectioned array of n records, each record comprising a key-value pair;
in a first stage number operation:
for each record:
extract an R number of most significant bits of a key of the key-value pair to create a control string; and
sort the record into one of the M outputs of the switching functional unit based on the control string; and
store records of the M outputs as a sorted sectioned array of M batches, in the memory;
for a total of X stage operations, for each next stage number operation, iteratively perform, for each of the $M^{(stage\ number-1)}$ batches stored in the memory:
receive each record of the batch from the memory;
for each record of the batch:
extract a next R number of most significant bits of the key to create a new control string; and
sorting the record into one of the M outputs based on the new control string; and
store the records of the M outputs as a sorted sectioned array of M batches, in the memory.

9. The data ordering device of claim 8, wherein each control string indicates to which of the M outputs the corresponding record belongs.

10. The data ordering device of claim 8, wherein a total of $\log_M n$ stages of the switching functional unit are configured to sort all n records.

11. The data ordering device of claim 8, wherein each stage involves $M^{(stage-1)}$ SFU operations of the switching functional unit to sort all records.

* * * * *